(12) United States Patent
Tedesco

(10) Patent No.: US 6,845,195 B2
(45) Date of Patent: Jan. 18, 2005

(54) CONFIGURABLE WAVELENGTH ROUTING DEVICE

(75) Inventor: James M. Tedesco, Livonia, MI (US)

(73) Assignee: Kaiser Optical Systems, Ann Arbor, MI (US)

(*) Notice: Subject to any disclaimer, the term of this patent is extended or adjusted under 35 U.S.C. 154(b) by 29 days.

(21) Appl. No.: 10/260,035

(22) Filed: Jun. 12, 2003

(65) Prior Publication Data

US 2004/0212897 A1 Oct. 28, 2004

Related U.S. Application Data

(63) Continuation of application No. 09/793,290, filed on Feb. 26, 2001, now abandoned.
(60) Provisional application No. 60/203,963, filed on May 12, 2000, and provisional application No. 60/184,893, filed on Feb. 25, 2000.

(51) Int. Cl.[7] .............................. G02B 6/34; G02B 6/28; G02B 6/32; H04J 14/00; H04J 14/02
(52) U.S. Cl. .............................. 385/37; 385/24; 385/33; 398/49; 398/83
(58) Field of Search .............................. 385/37, 16–18, 385/33, 34, 24; 398/49, 45, 55, 83–85

(56) References Cited

U.S. PATENT DOCUMENTS

| | | | |
|---|---|---|---|
| 4,462,687 A | 7/1984 | Krause | |
| 4,673,270 A | 6/1987 | Gordon | |
| 5,140,459 A | 8/1992 | Sagan | |
| 5,479,082 A | 12/1995 | Calvani et al. | |
| 5,488,500 A | 1/1996 | Glance | |
| 5,566,014 A | 10/1996 | Glance | |
| 5,583,855 A | 12/1996 | Ball | |
| 5,600,473 A | 2/1997 | Huber | |
| 5,606,439 A | 2/1997 | Wu | |
| 5,625,478 A | 4/1997 | Doerr et al. | |
| 5,717,795 A | 2/1998 | Sharma et al. | |
| 5,719,697 A | 2/1998 | Pedersen | |
| 5,726,785 A | 3/1998 | Chawki et al. | |
| 5,748,349 A | 5/1998 | Mizrahi | |
| 5,754,321 A | 5/1998 | Giles et al. | |
| 5,771,112 A | 6/1998 | Hamel et al. | |
| 5,777,742 A | 7/1998 | Marron | |
| 5,778,118 A | 7/1998 | Sridhar | |
| 5,812,291 A | 9/1998 | Bendelli et al. | |
| 5,815,278 A | 9/1998 | Johnston et al. | |
| 5,822,095 A | 10/1998 | Taga et al. | |

(List continued on next page.)

Primary Examiner—Georgia Epps
Assistant Examiner—Jack Dinh
(74) Attorney, Agent, or Firm—Gifford, Krass, Groh, Sprinkle, Anderson & Citkowski, PC

(57) ABSTRACT

A dispersive optical element and positionable micromirrors are deployed to implement a configurable wavelength routing device for add/drop and other applications. Input light is dispersed and imaged onto a focal plane where there is disposed an array of light redirection elements operative to decenter wavelengths on a selective basis. In the preferred embodiment, the dispersive optical element is a grating or grating/prism featuring a high degree of dispersion allowing the input and return paths to be parallel and counter-propagating, both for a compact size and to facilitate a lateral shifting in a localized area. The inputs and outputs may be implemented in conjunction with optical fibers, with a lens being used to collimate light prior to illumination of the grating. A focusing lens is preferably used to form a nominally telecentric image of the dispersed spectrum at the image plane. A control mechanism is provided to locate individual mirrors of the array in one of at least two positions, to effectuate the selective wavelength routing. In the preferred embodiment, the mirrors are 90 degree V-mirrors, translatable within the plane of the telecentric image, such that in one position, a common port is coupled to an express port and whereas, in another position, a common port is placed in communication with an add/drop port.

9 Claims, 12 Drawing Sheets

U.S. PATENT DOCUMENTS

| | | |
|---|---|---|
| 5,832,154 A | 11/1998 | Uetsuka et al. |
| 5,848,207 A | 12/1998 | Uetsuka et al. |
| 5,859,941 A | 1/1999 | Horita et al. |
| 5,867,289 A | 2/1999 | Gerstel et al. |
| 5,881,199 A | 3/1999 | Li |
| 5,915,051 A | 6/1999 | Damask et al. |
| 5,926,283 A | 7/1999 | Hopkins |
| 5,926,300 A | 7/1999 | Miyakawa et al. |
| 5,946,430 A | 8/1999 | Morrow et al. |
| 5,953,141 A | 9/1999 | Liu et al. |
| 5,959,749 A | 9/1999 | Danagher et al. |
| 5,960,133 A | 9/1999 | Tomlinson |
| 5,974,207 A | 10/1999 | Aksyuk et al. |
| 5,978,114 A | 11/1999 | Clark et al. |
| 5,982,497 A | 11/1999 | Hopkins |
| 5,982,518 A | 11/1999 | Mizrahi |
| 5,991,048 A | 11/1999 | Karlson et al. |
| 5,999,290 A | 12/1999 | Li |
| 6,002,503 A | 12/1999 | Mizrahi |
| 6,020,986 A | 2/2000 | Ball |
| 6,025,943 A | 2/2000 | Meekers et al. |
| 6,038,045 A | 3/2000 | Sotom et al. |
| 6,038,357 A | 3/2000 | Pan |
| 6,041,152 A | 3/2000 | Clark |
| 6,061,157 A | 5/2000 | Terahara |
| 6,061,484 A | 5/2000 | Jones et al. |
| 6,069,719 A | 5/2000 | Mizrahi |
| 6,084,694 A | 7/2000 | Milton et al. |
| 6,091,869 A | 7/2000 | Sundelin |
| 6,101,012 A | 8/2000 | Danagher et al. |
| 6,111,681 A | 8/2000 | Mizrahi et al. |
| 6,115,157 A | 9/2000 | Barnard et al. |
| 6,115,516 A | 9/2000 | Watson et al. |
| 6,122,095 A | 9/2000 | Fatehi |
| 6,122,096 A | 9/2000 | Fatehi |
| 6,130,765 A | 10/2000 | Gautheron et al. |
| 6,134,036 A | 10/2000 | Andreozzi et al. |
| 6,141,467 A | 10/2000 | Doerr |
| 6,144,474 A | 11/2000 | Nitta et al. |
| 6,146,713 A | 11/2000 | Cullen et al. |
| 6,154,581 A | 11/2000 | Lu et al. |
| 6,154,590 A | 11/2000 | Jin et al. |
| 6,163,392 A | 12/2000 | Condict et al. |
| 6,163,393 A | 12/2000 | Wu et al. |
| 6,166,838 A | 12/2000 | Liu et al. |
| 6,169,616 B1 | 1/2001 | Cao |
| 6,173,093 B1 | 1/2001 | Jeal |
| 6,175,432 B1 | 1/2001 | Wu et al. |
| 6,175,448 B1 | 1/2001 | Xie et al. |
| 6,178,033 B1 | 1/2001 | Ford et al. |
| 6,181,849 B1 | 1/2001 | Lin et al. |
| RE37,044 E | 2/2001 | Wu |
| 6,185,023 B1 | 2/2001 | Mizrahi |
| 6,188,509 B1 | 2/2001 | Lee et al. |
| 6,188,816 B1 | 2/2001 | Solheim |
| 6,501,877 B1 | 12/2002 | Weverka et al. |

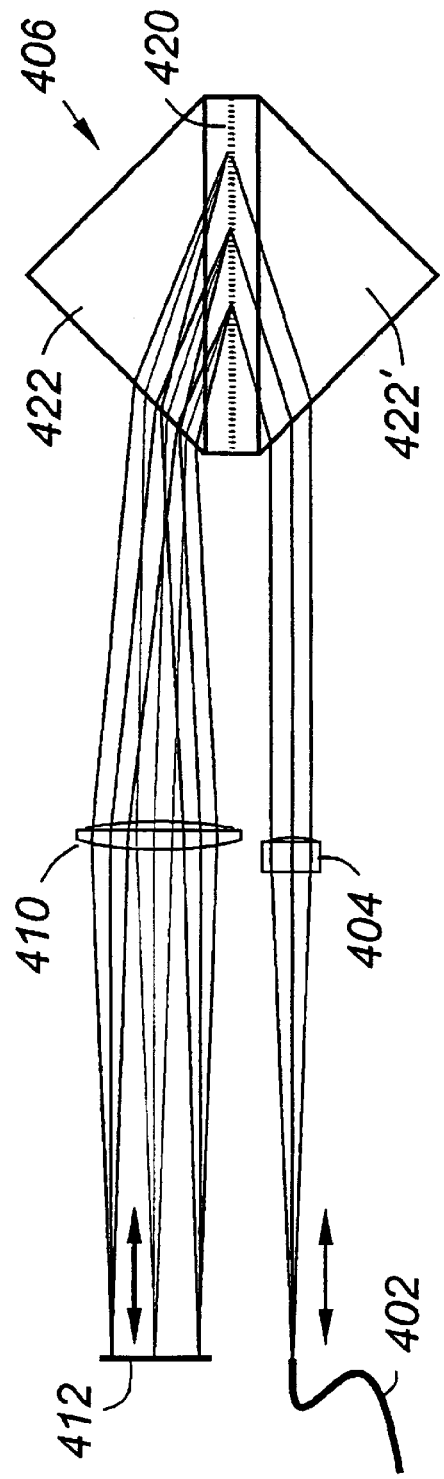
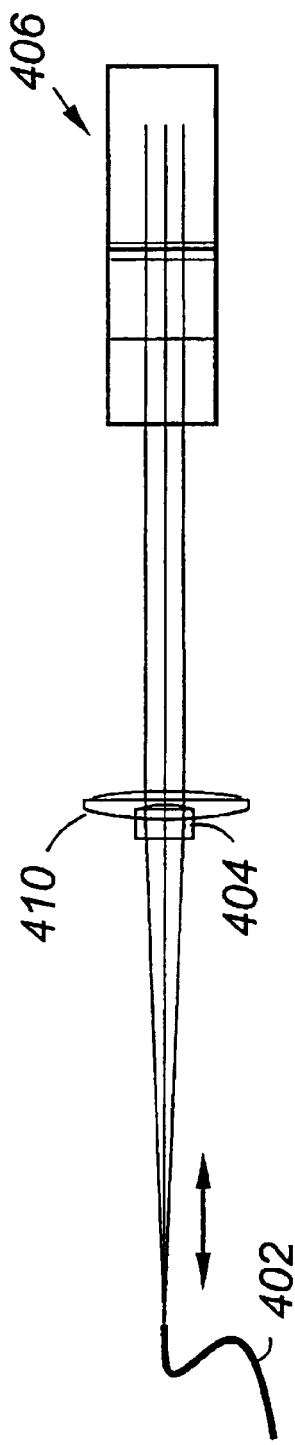
Fig - 4A
Fig - 4B

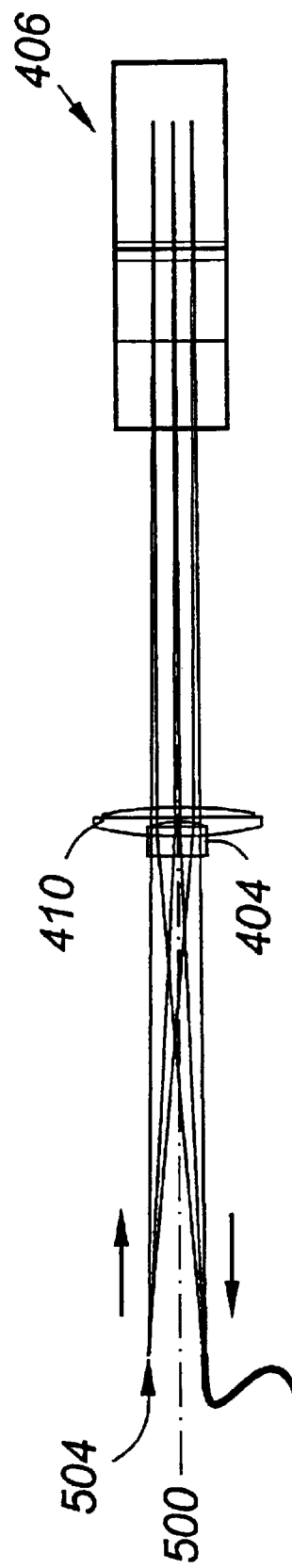
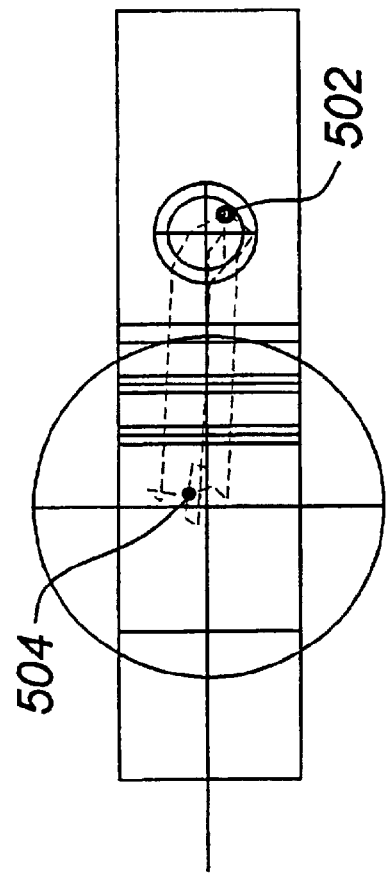

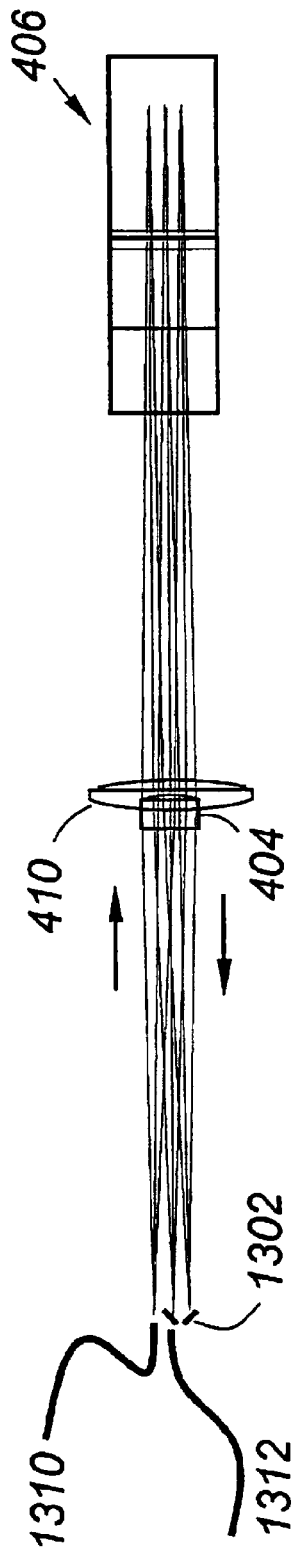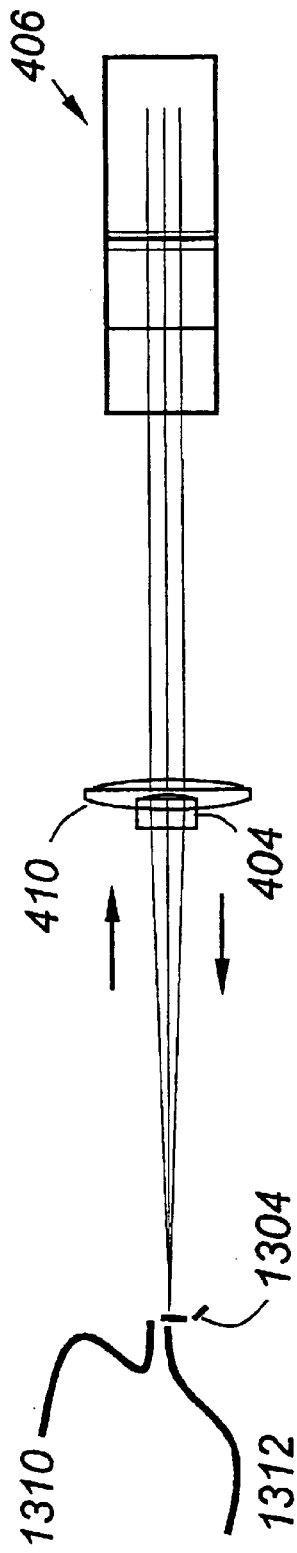
Fig - 13A
Fig - 13B

CONFIGURABLE WAVELENGTH ROUTING DEVICE

REFERENCE TO RELATED APPLICATIONS

This application is a continuation of U.S. patent application Ser. No. 09/793,290, filed Feb. 26, 2001 now abandoned, which claims priority of U.S. provisional application Ser. No. 60/184,893, filed Feb. 25, 2000, and 60/203,963, filed May 12, 2000, the entire content of each application being incorporated herein by reference.

FIELD OF THE INVENTION

This invention related generally to optical communications and, in particular, to a configurable wavelength routing device finding utility in various applications including use as an optical add/drop module (OADM) in a dense wavelength division multiplexing (DWDM) system.

BACKGROUND OF THE INVENTION

Optical telecommunications over optical fibers is now the preferred mode of high-bandwidth data transmission in comparison to copper wire, particularly over long distances. Such systems use lasers modulated in amplitude by the data to be transmitted. The signals are coupled into an optical fiber for detection and demodulation at the other end of the link. The existing infrastructure of long-haul optical fiber is rapidly becoming taxed to its bandwidth capacity. Laying more fiber to carry additional bandwidth is an extremely expensive proposition.

Dense wavelength-division multiplexing (DWDM) has emerged as a more cost-effective solution. The idea is to force existing fibers to carry more bandwidth by combining signals from multiple lasers operating at different wavelengths onto a single fiber. Key components of DWDM systems include the optical multiplexers and demultiplexers, the latter often being the former operated in reverse. The multiplexers take optical signals at different wavelengths propagating on different fibers and combine them onto a single fiber. The demultiplexers take several wavelengths propagating on a common fiber and separate them onto different fibers.

Another important component in a DWDM system is the add/drop module, or OADM. The OADM is used to drop or pick-off wavelengths 102 to carry local node traffic to businesses or other destinations for optical or electro-optical conversion. The OADM is also used to re-insert wavelengths 104, typically carrying new data, back into the DWDM fiber(s). These functions are illustrated schematically in FIG. 1. An incoming fiber 110 carries multiple DWDM wavelengths 112 into the module, and an outgoing fiber 120 outputs the modified DWDM traffic 122. Unmodified or express wavelengths are depicted at 130.

As shown in FIGS. 2A and 2B, existing OADMs utilize passive components to define a fixed wavelength or a set of wavelengths to be dropped or added. FIG. 2A shows a single-wavelength schematic, having a fixed fiber Bragg grating 202 to drop and add $\lambda_i$, whereas FIG. 2B illustrates a multiple wavelength schematic to add and drop two fixed wavelengths, $\lambda_i$ and $\lambda_j$ using Bragg gratings 212 and 214. Items such as 202 represent circulators. FIG. 3 depicts a wavelength-configurable system including input wavelength multiplexers 302 and output demultiplexers 304 on the other side of a fiber-optic crossbar switch 310. A network control function 312 is used to dictate which channels are dropped and added according to the switch settings.

Although configurations of the type just described have been in use for some time, they are inflexible and/or expensive due to the discrete nature of the components involved. As such, systems based on these concepts tend to be expensive to implement and maintain. Accordingly, there remains a need for a more flexible, easier to implement OADM for use in DWDM and other applications.

SUMMARY OF THE INVENTION

This invention utilizes a dispersive optical element and positionable micromirrors to implement a configurable wavelength routing device for add/drop and other applications. Broadly, input light is dispersed and imaged onto a focal plane where there is disposed an array of light redirection elements operative to decenter wavelength images on a selective basis. In the preferred embodiment, the decentered wavelengths are returned through the same grating and directed to points shifted laterally with respect to the input so as to implement wavelength routing or add/drop functions.

In the preferred embodiment, the dispersive optical element is a grating or grating/prism featuring a high degree of dispersion allowing the input and return paths to be parallel and counter-propagating, both for a compact size and to facilitate a lateral shifting in a localized area. The inputs and outputs may be implemented in conjunction with optical fibers, in which case a lens is used to collimate light for a illumination through the grating, and to focus return beams to respective inputs or outputs, as the case may be. A focusing lens is preferably spaced approximately one focal length from the output of the dispersing element, so as to form a nominally telecentric image of the dispersed spectrum; that is, with the primary rays being incident substantially perpendicular to the image plane at all wavelengths of interest.

An array of reflectors is positioned at the focal plane, and a control mechanism is provided to locate individual mirrors of the array in one of at least two positions, to effectuate the selective wavelength routing. In the preferred embodiment, the mirrors are 90 degree V-mirrors, translatable within the plane of the telecentric image, such that in one position, a common port is coupled to an express port and whereas, in another position, a common port is placed in communication with an add/drop port.

Various alternative configurations of the reflector array are described in detail. Although a unitary V-shaped mirror element is used in the array, one side of the mirror may also fold down to permit a direct reflection, thereby creating a direct coupling between common and express ports. In such a configuration, the device functions as a two-port module, as opposed to a three-port module, such that one or more circulators may desirably be added to isolate wavelength paths.

According to a different embodiment, a multi-position "W" mirror array may be used at the spectral image plane, such that, in one position, input wavelengths are coupled to an express port, whereas, in a shifted position, input and add/drop ports are placed in communication. Further alternative embodiments include the use of N-position mirrors, which may be tilted and/or translated to realize an N-port routing capability.

BRIEF DESCRIPTION OF THE DRAWINGS

FIG. 4A is a top view of an optical configuration used to introduce concepts according to the invention;

FIG. 4B is a side-view of the configuration of FIG. 4A;

FIG. 5A shows how an object decentered in a plane perpendicular to dispersion may be used to image a point decentered by an equal amount opposite the lens axis;

FIG. 5B is an end view of the arrangement of FIG. 5A;

FIG. 13A is a drawing of a 2-port configuration using an array of mirrors of the type shown in FIG. 12, showing a mirror element in an add/drop position;

FIG. 13B shows the 2-port configuration of FIG. 13A with a mirror element of the type shown in FIG. 12 tilted to the express position;

DETAILED DESCRIPTION OF THE INVENTION

Figure 1:
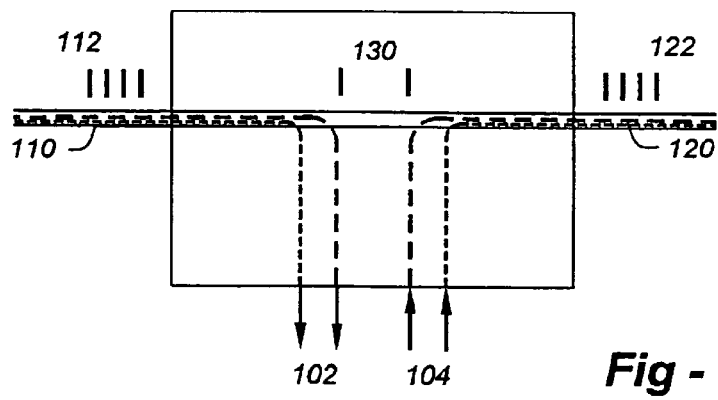
FIG. 1 is a simplified schematic of an optical add/drop module (OADM) for wavelength routing in a multi-node network.
Figure 3:
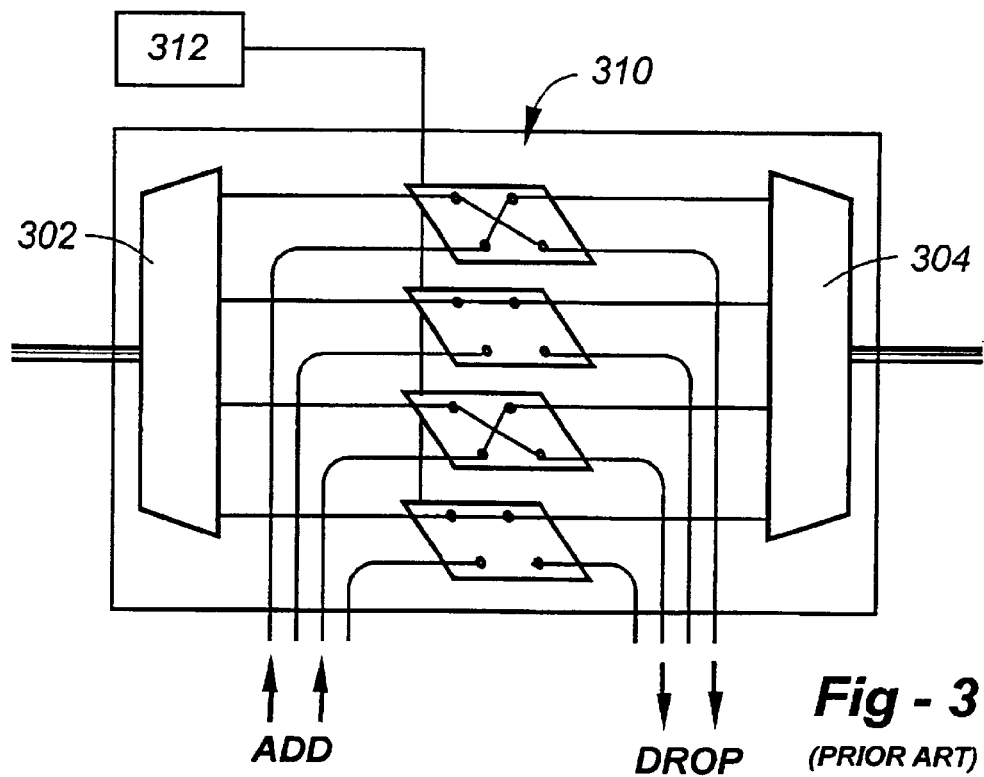
FIG. 3 is a drawing of an existing configurable OADM utilizing a wavelength multiplexer and demultiplexer in conjunction with an array of 2×2 fiber switches.
Figure 2A:
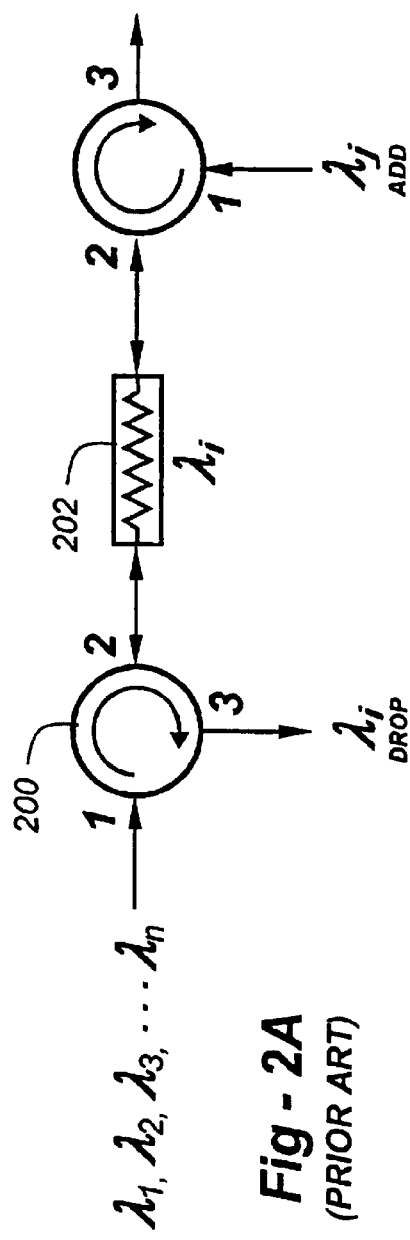
FIG. 2A is a schematic of a single-wavelength OADM using passive components to define a fixed wavelength.
Figure 2B:
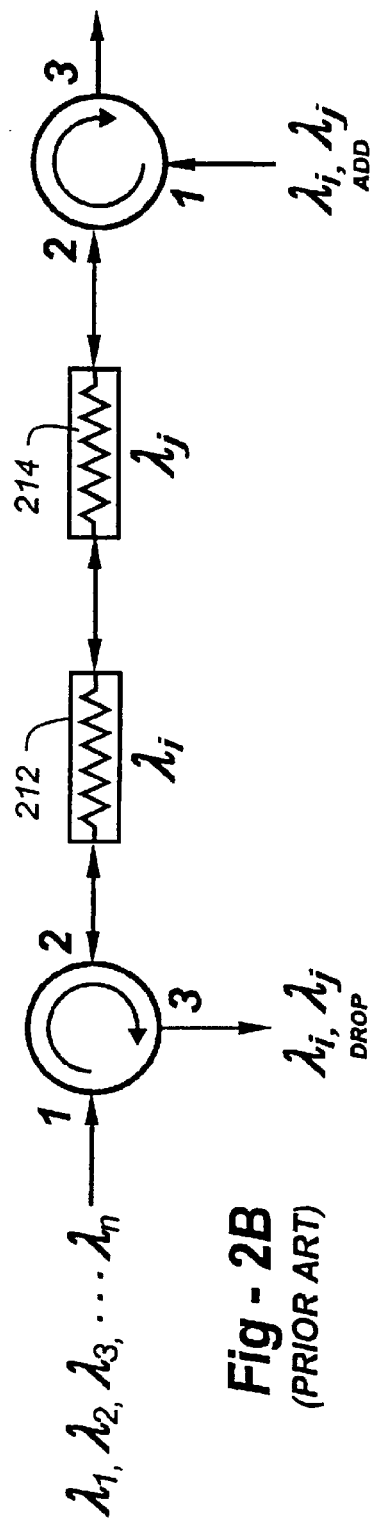
FIG. 2B is a schematic of a multiple-wavelength prior-art OADM also utilizing passive components.

Having introduced and discussed certain prior-art configurations with references to FIGS. 1 through 3, the reader's attention is directed to FIGS. 4A and 4B, which will be used to introduce a novel wavelength routing system according to the invention. FIG. 4A is a top-view of the arrangement, wherein an input fiber 402 carrying multiple wavelengths is collimated by element 404 and dispersed by element 406. A telecentric imaging lens 410 is used to focus the dispersed spectrum at focal plane 412. A reflective surface such as a flat mirror is placed at focal plane 412, which is operative to retro reflect the dispersed wavelength bundle back along its original path and into input fiber 402, as enabled by the telecentric nature of the image.

FIG. 4B is a side-view illustration of the configuration of FIG. 4A, keeping in mind that the dispersed spectrum lies along a line into the paper. Dispersive element 406 preferably includes a holographically derived grating 420 sandwiched between optical blocks 422 and 422', enabling incident and exit paths to lie on parallel paths, as shown. However, it must be understood that such a compact dispersive element need not be used according to the invention, in that the incident and exit paths need not be parallel, and a reflective as opposed to transmissive grating may alternatively be used.

Having introduced the concept of retro reflecting the dispersed wavelength bundle at the telecentric image back along its original path to an input fiber, reference is now made to FIGS. 5A and 5B, which illustrate the concept of decentering as used advantageously by this invention. As shown in FIG. 5A, an object 504 decentered from the lens axis 500 will image to a point decentered by an equal amount opposite the lens axis as shown in the end-view of FIG. 5B. Accordingly, light delivered in the position of the object 504 may be received in a decentered collection fiber 502 at the image plane.

Figure 6:
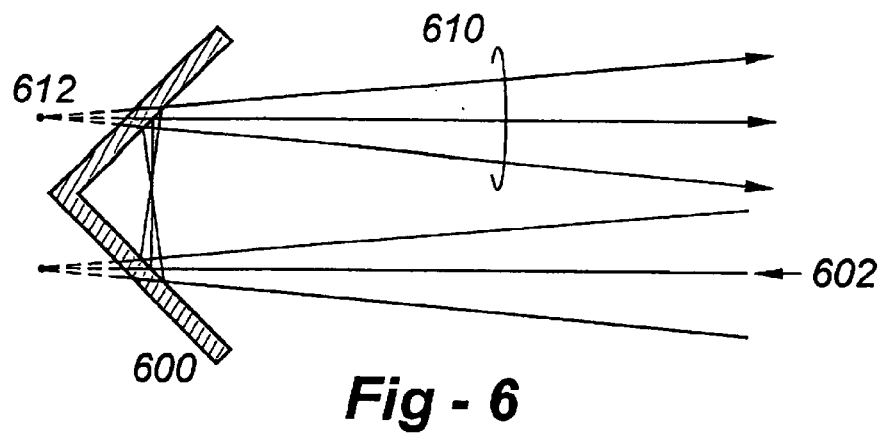
FIG. 6 is a drawing which shows how a V-mirror according to the invention may be used to convert a point in a dispersed spectral image into a decentered virtual object for the return path.

According to this invention, the concepts of retro reflection and decentering are used to convert a point in the dispersed spectral image into a decentered virtual object for the return path, as depicted in FIG. 6. In place of a flat mirror, a 90 degree V-mirror element 600 is positioned with respect to each wavelength position of interest relative to lens axis 602. A centered light bundle from the grating and lens along the lens axis 602 is now decentered using the V-mirror, for a return along path 610 emanating from virtual image 612. Again, although a 90 degree V-mirror element is used to force decentering along a parallel counter-propagating path, other beam redirection configurations may alternatively be used to cause decentering according to the invention, perhaps with the addition of other optical elements.

The mirror array is preferably fabricated utilizing micro mechanical (MEMS) technology, wherein electronically addressable micro actuators are used to manipulate micro mirrors on a selective basis. A preferred decenter of 250 microns is used on each side of the optical axis so as to be compatible with industry standard V-groove fiber mounting components. A multi-element focusing lens may alternative be used to achieve resolution, throughput and cross-talk specifications compatible with 50 GHz DWDM channel spacings.

Figure 7A:
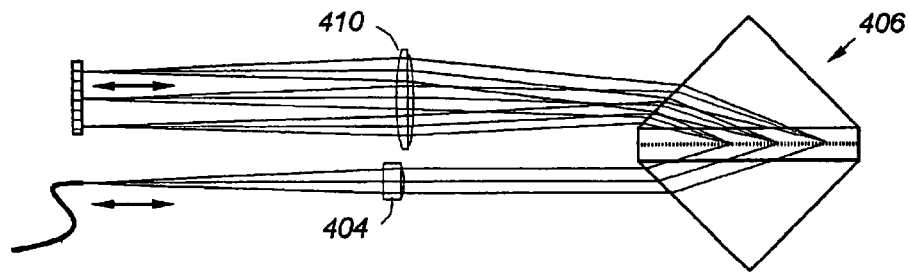
FIG. 7A is a schematic drawing showing how a V-mirror array may be employed by the invention to implement a wavelength-configurable router as a 3-port device.
Figure 7B:
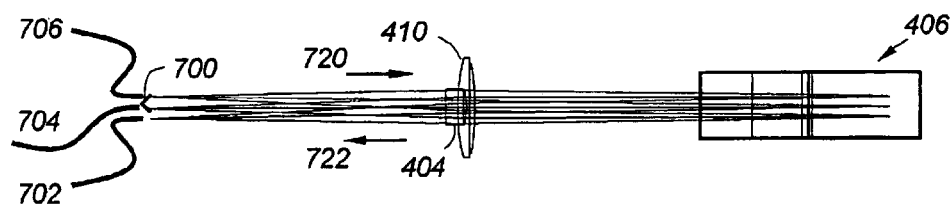
FIG. 7B is a side view of the configuration of FIG. 7A, showing a V-mirror in position A routing its common port to port A.

FIGS. 7A and 7B illustrate the use of a V-mirror array in implementing a wavelength-configurable 3-port router according to the invention. FIG. 7A is a top-view of the arrangement, whereas FIG. 7B is a side-view. The configurations of FIGS. 7A and 7B are similar to those of FIGS. 4A and 4B, except that the planar retro-reflector has been replaced with the V-mirror array 700. As such, instead of retro reflecting all wavelengths back into the input fiber 704, the use of a V-mirror decenters the returns on a selective basis. Additionally, by translating the array in the focal plane, wavelengths may be arbitrarily routed with respect to multiple fibers positioned at decentered locations on a selective basis. In FIG. 7B, for example, with the V-mirror in the position shown, a wavelength from centered input fiber 704 will be reimaged to fiber 702, whereas, as shown in FIG. 7C, with the V-mirror element moved to the position shown, a particular wavelength is reimaged to fiber 706.

Figure 8:
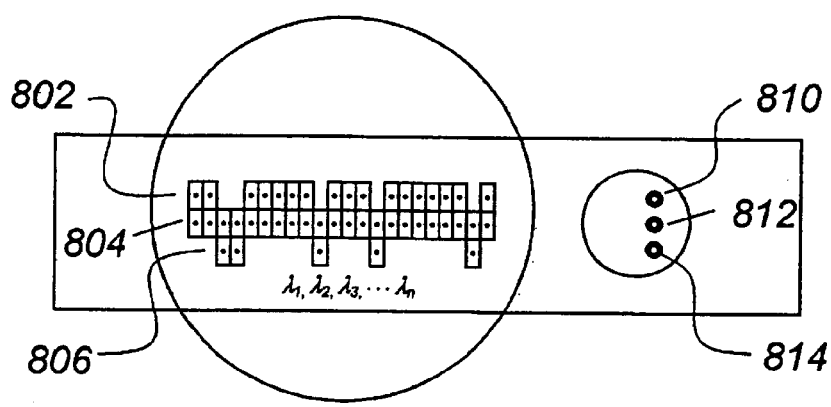
FIG. 8 is an end view drawing illustrating an array of V-mirrors at the spectral image plane configured to route some common-port wavelengths to port A and others to port B, according to the configurations of FIG. 7.
Figure 7C:
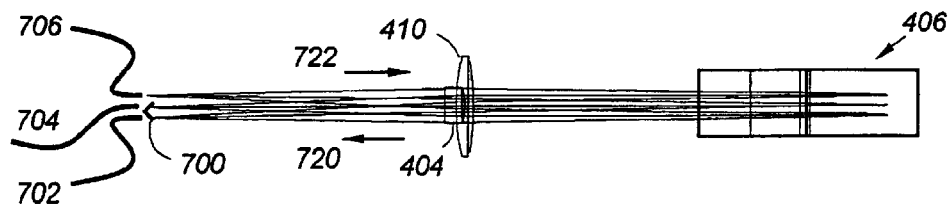
FIG. 7C is a similar side view drawing showing a V-mirror in position B routing its common port to port B.

FIG. 8 is an end-view of FIG. 7 which illustrates the concept of multiple differently-routed wavelengths according to the invention. The centered common fiber is shown on the right at 812, with decentered fibers 810 and 814 above and below, respectively. With dispersion occurring from the left to the right in this drawing, with the V-mirror elements in the position of FIG. 7B, decentered virtual images are shown at the top, whereas, with the mirror elements in the position of FIG. 7C, the corresponding wavelengths are shown along the bottom of the diagram. Wavelengths corresponding to mirror elements in the position of FIG. 7B are routed to the decentered fiber just below the common fiber 812, and wavelengths corresponding to mirror elements in the position of FIG. 7C are routed to decentered fiber just above the common fiber 812.

Figure 9:
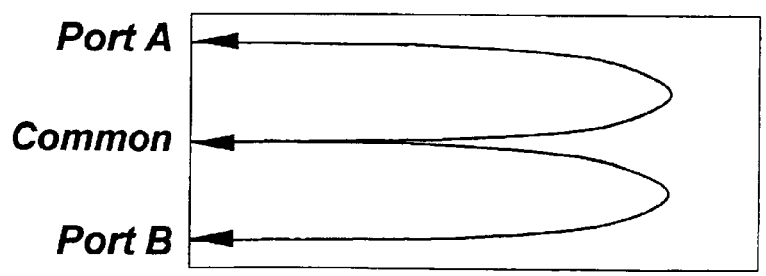
FIG. 9 is a functional block diagram of the 3-port device of FIGS. 7 and 8 which shows how the common port may be coupled by wavelengths to one of two other ports according to the invention.

FIG. 9 illustrates the embodiment of FIGS. 7 and 8 in the form of a functional block diagram. Broadly, a common port is used to couple wavelengths to either of two other ports selected by the movement of the mirror elements, in either direction. Such a device may therefore be thought of as a wavelength-configurable three-port splitter/combiner.

Figure 10:
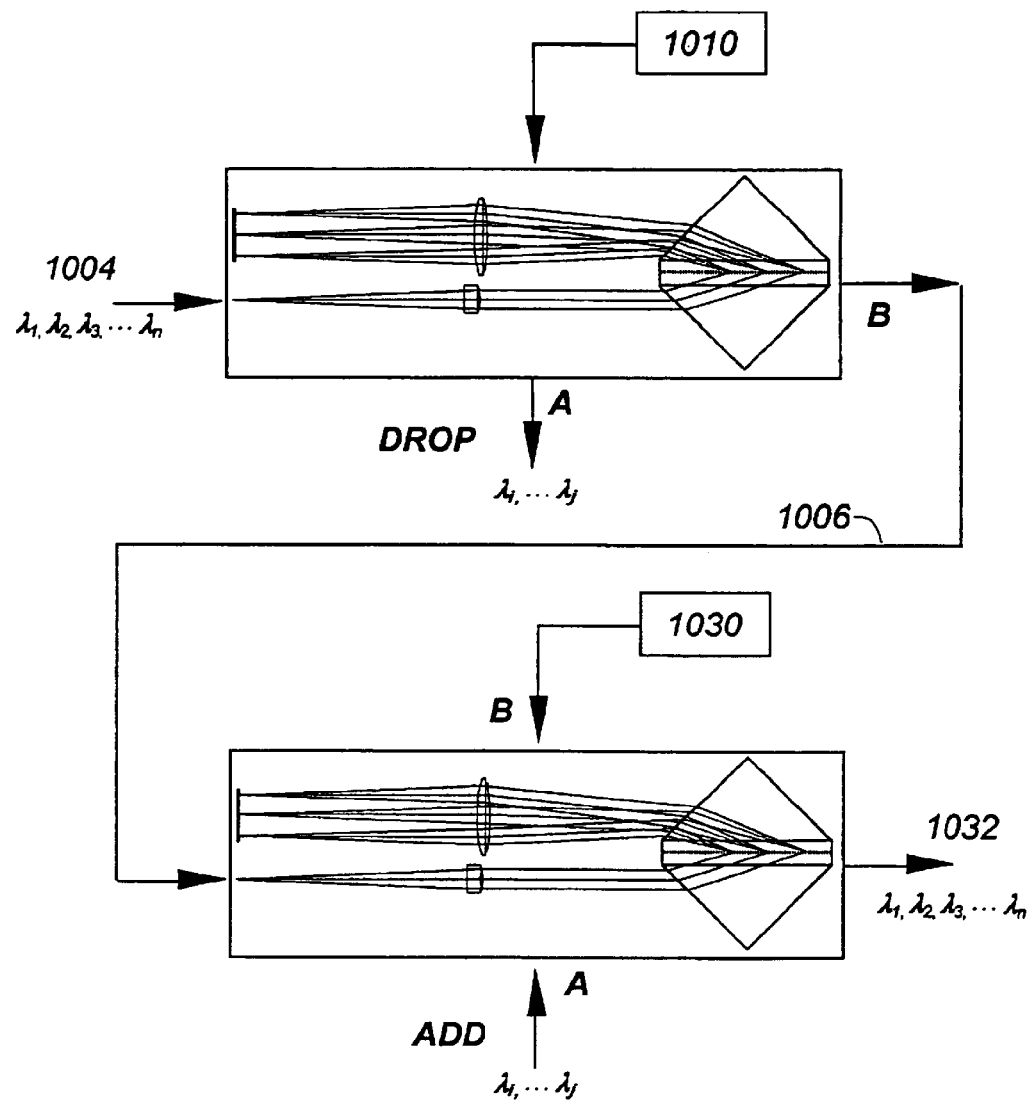
FIG. 10 illustrates a comprehensive system according to the invention, implementing both drop and add functions by cascading two of the 3-port devices of FIGS. 7 and 8.

FIG. 10 is a drawing which illustrates how a device according to the invention as shown in FIGS. 7 and 8 may be configurable for use in both drop/add modes, as well as cascaded to form a complete optical add/drop module (OADM). A drop function is shown at the top, wherein a plurality of wavelengths $\lambda_1, \lambda_2, \lambda_3, \ldots \lambda_n$, are carried on a common fiber 1004, and wherein $\lambda_i, \ldots \lambda_j$ are dropped at position A. The remaining wavelengths proceed through along express path 1006 at position B under network control 1010, which commands the mirror element positions. An add function is implemented below, wherein the express wavelengths at position B are input, and wavelengths $\lambda_i, \ldots \lambda_j$ are added at position A under separate network control 1030. A full set of wavelengths are then output along common path 1032.

Figure 11:
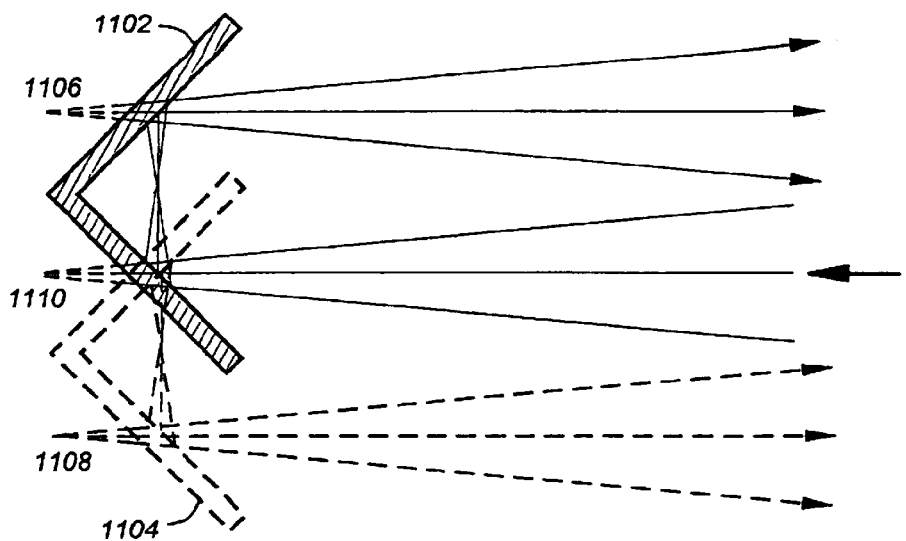
FIG. 11 is a schematic illustration which shows how a V-mirror is used in two positions to decenter a common port image in two different directions for routing to two different output ports according to FIG. 7.

By way of a review, FIG. 11 is a close-up view of reflectors according to the invention operated with respect to the preferred embodiment. Light associated with the common port is returned from a real centered image 1110 generated by the grating and lens. With the V-reflector in the express position 1102, a decentered virtual image is developed in alignment with the express port 1106, whereas, with the reflector in the add/drop position 1104, a decentered virtual image is generated with respect to the add/drop port 1108.

Figure 12:
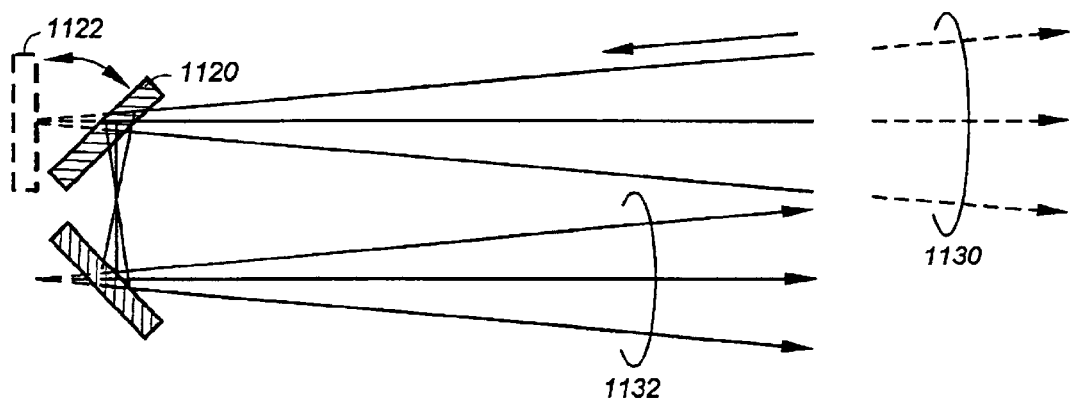
FIG. 12 illustrates an alternative micro-mirror configuration for a two-port device having a direct retro-reflection express position and a fold-down add/drop position.

FIG. 12 illustrates an alternative embodiment of the invention, wherein instead of a unitary V-mirror, one side of the reflector folds down into the express position 1122 from the add/drop position 1120, thereby coupling the express bundles 1130 to the input fiber. Thus, the module now functions as a two-port device. Add/drop bundles coupled to the decentered fiber are shown at 1132.

FIG. 13A is a side view drawing of the 2-port embodiment introduced in FIG. 12, showing a mirror element in the add/drop position 1302. The mirror is tilted to the add/drop position such that the decentered path to and from the tilted mirror is coupled to the add/drop fiber 1310, as shown. FIG. 13B is a similar side view of this 2-port configuration showing a mirror element in the express position 1304, wherein the center path to and from the untilted mirror is retro reflected to the same centered fiber 1312.

Figure 14:
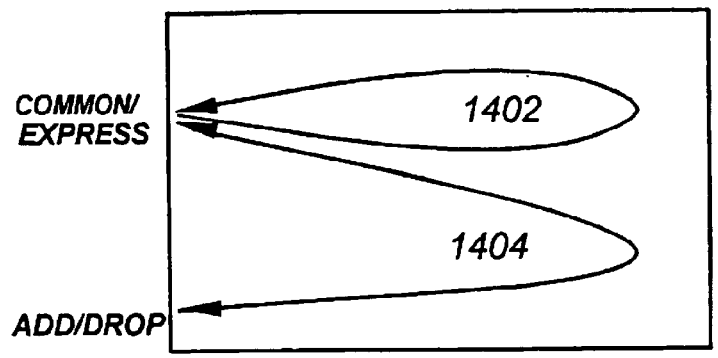
FIG. 14 is a simplified functional block diagram of the 2-port configuration of FIGS. 13A and 13B.

The overall concept of the modified 2-port device according to the alternative embodiment of FIGS. 12 and 13 is depicted functionally in FIG. 14. With the mirror untilted or planar with respect to the image plane, express wavelengths are looped back out through a common/express port at 1402, whereas, with certain of the mirrors selectively tilted, add/drop wavelengths are routed at 1404 out of, or into, the add/drop port.

Figure 15:
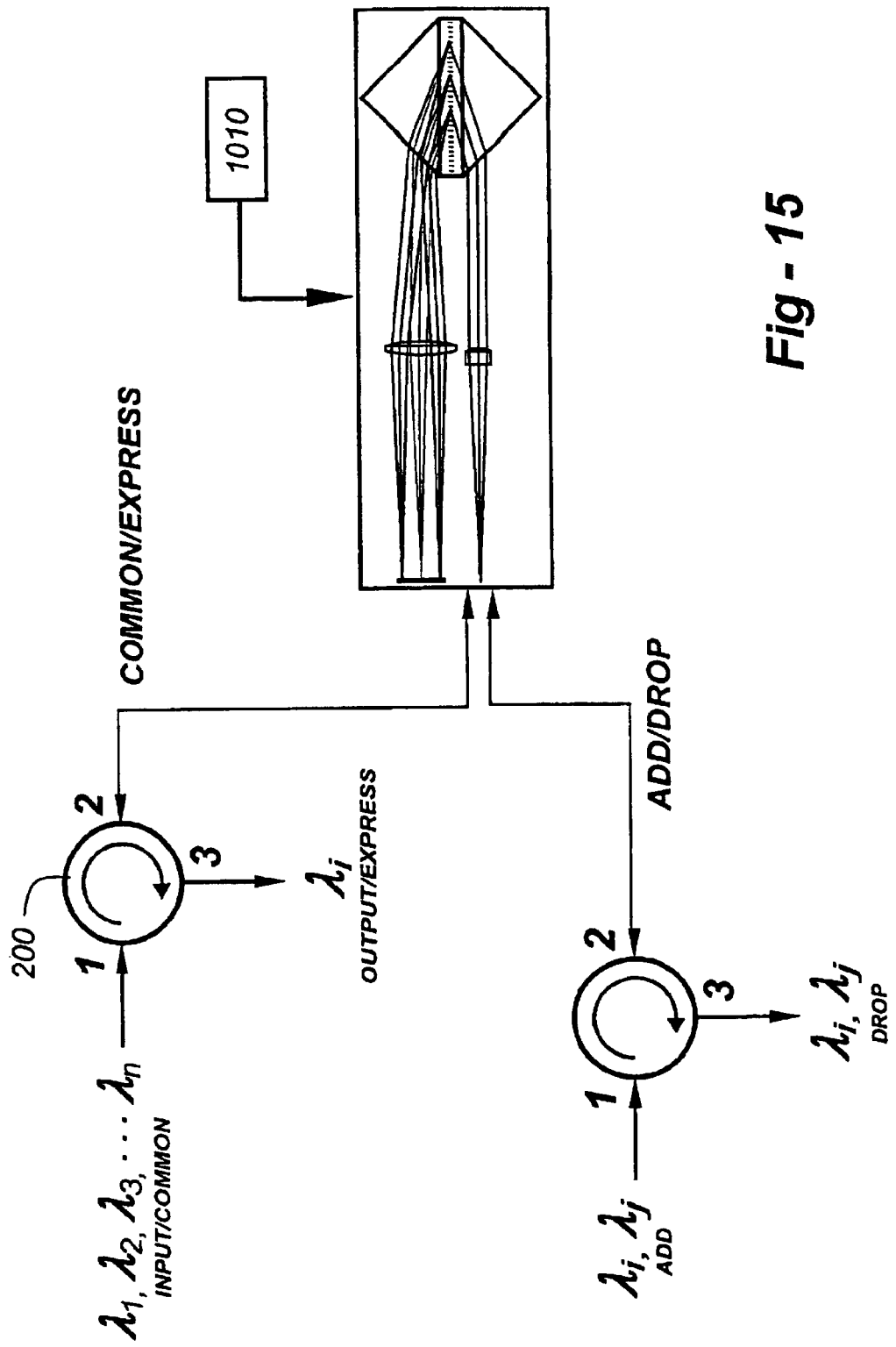
FIG. 15 is a schematic illustration of a complete add/drop system using a single two-port device of the type shown in FIGS. 12 through 14 in conjunction with two circulators.

Given that this alternative embodiment functions as a two-port device, circulators may be added to implement a complete 4-port add/drop module under network control 1010, as shown in FIG. 15. Wavelengths received through an input/common port are fed to circulator 200. Express wavelengths from this group are retroreflected from the untilted mirrors back to the common/express fiber of the 2-port device, and then output through port 3 of the circulator due to their reverse direction of propagation. Input wavelengths routed to the add/drop fiber of the 2-port device by tilted mirror elements are routed to the drop port due to their direction of propagation. These same dropped wavelengths may be added with different signal traffic back onto the Output/Express port by sending them to the circulator Add port, where they are routed by the circulator to the decentered add/drop fiber of the 2-port device, and imaged to the centered common/express fiber by the same tilted mirror elements.

Although the modified alternative embodiment of the OADM just described may be more expensive as a stand-alone drop-only or add-only unit, due to the fact that at least one circulator is needed to isolate common/express wavelengths, the modified version does offer certain advantages. For one, only one pass is made through the grating/mirror module, thereby potentially affording a lower insertion loss. Indeed, only one grating/mirror module is required to implement a complete OADM, though two circulators are required in a robust configuration. The alternative system also features a simpler mirror/actuation structure, in that a single tilting flat mirror as opposed to a translating V-mirror may be used at each wavelength position.

In addition, although the devices just described are used to route input wavelengths to either of two ports, the invention may be extended to N output ports, though a trade off exists in terms of complexity and wavelength resolution. Broadly, the two-position mirror may be replaced with an N-position mirror, with the additional position decentering the reflected image further away from the optical axis. More than one surface must be actuated for each wavelength, and/or the actuation must be carried out in more than one dimension. The approach may be extended to arbitrarily couple a wavelength between any two ports.

Figure 16A:
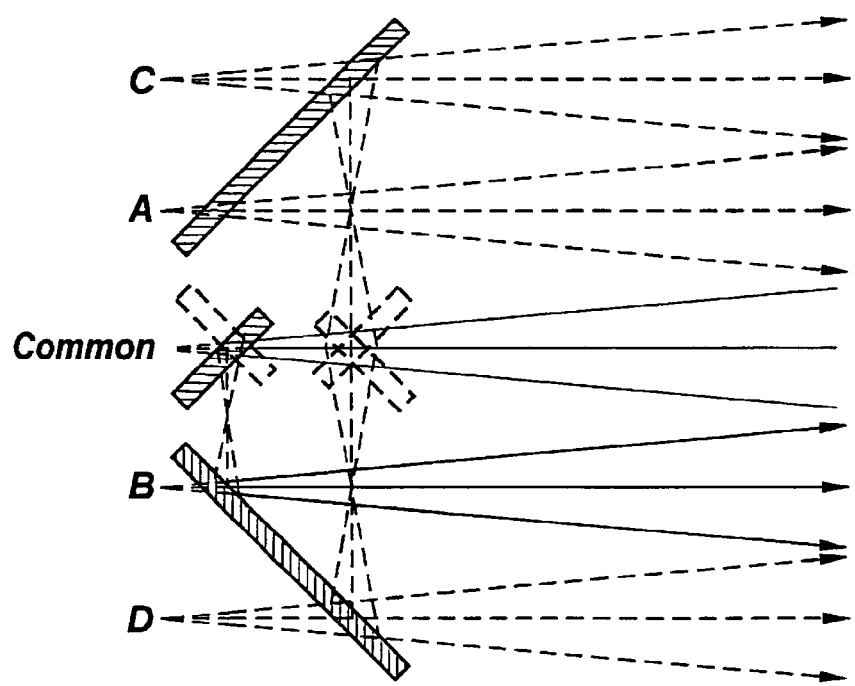
FIG. 16A is a drawing which illustrates mirror configurations for a one-into-four router.
Figure 16B:
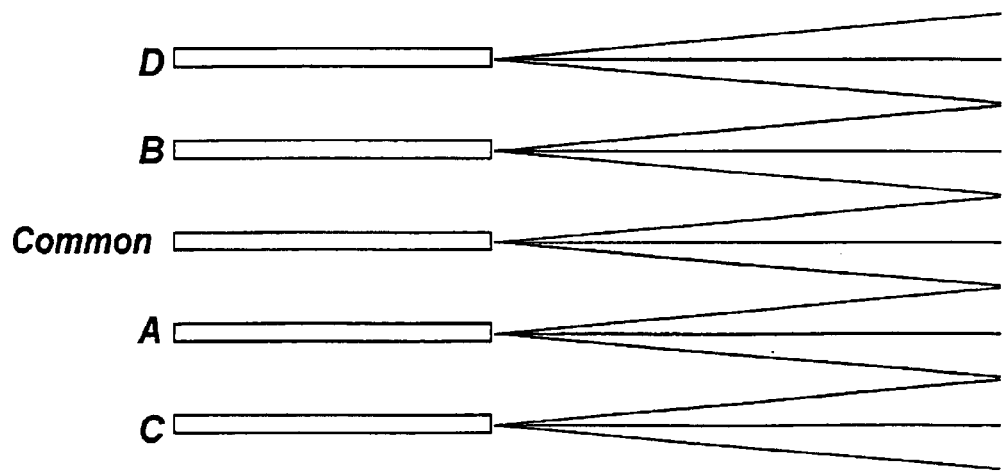
FIG. 16B is a drawing which shows the fiber positions addressed by the mirror positions of FIG. 16A.

FIGS. 16A and 16B illustrate the extension of the invention to a one-into-four router. As shown in FIG. 16A, a small tilting and rotational mirror is supported relative to the real image of the common path, and may be tilted in either direction with respect to fiber positions A and B, or translated and tilted in either direction for fiber positions C and D. The relationship between the common input and the add/drop positions is shown in FIG. 16B. The addressing motion is therefore multi-dimensional, with a single actuated element in each wavelength. Note, that the larger decenterers move the mirrors further from the spectral focus, thereby potentially reducing the achievable level of resolution as the number of ports grows. Further extensions of this embodiment include alternative mirror/fiber configurations, and additional ports.

Figure 17A:
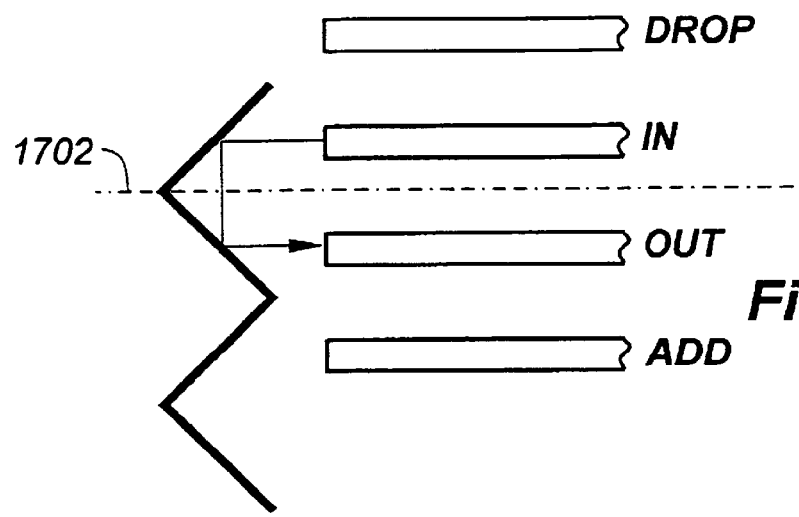
FIG. 17A is a schematic drawing of a further alternative embodiment of the invention allowing the implementation of a full 4-port add/drop device through the use of a two-position "W" mirror array at the spectral image plane, with no additional circulators or cascaded gratings required, with the W-mirror shown in the express position.
Figure 17B:
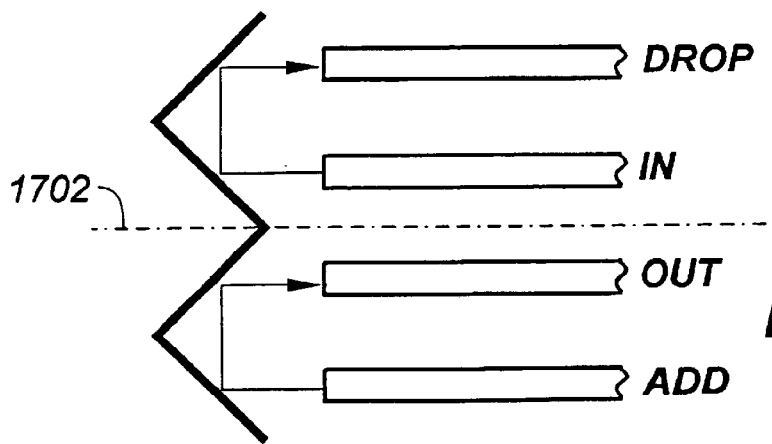
FIG. 17B is a drawing of the configuration of FIG. 17A, with the position of the W-mirror at the add/drop position.

As yet a further alternative and perhaps preferred embodiment of the invention, a translatable unitary "W" mirror array may be used at the spectral image plane, as shown schematically in FIGS. 17A and 17B. The express position of a mirror element is shown in FIG. 17A, wherein wavelengths received over the input port are routed back out the output port. The optical axis is shown at 1702. In the add/drop position of FIG. 17B, however, the "W" mirror has been moved upwardly in the drawing, such that input wavelengths are routed out a separate drop port, and add wavelengths are reinserted into the output port. This configuration has the advantage of providing a full 4-port add/drop router using a single dispersive module without the use of expensive circulators, while still requiring only two different lateral mirror positions as per the 3-port device. The only added complexity is in the fabrication of a more complicated mirror element.

I claim:

1. A configurable wavelength routing device, comprising:
   a light input;
   a light output;
   a dispersive optical element supported to receive the light from the input and disperse the light into a dispersed spectrum;
   a lens to form a telecentric image of the dispersed spectrum at an image plane;
   an array of reflectors disposed at the image plane; and
   a controller for positioning the reflectors to return particular wavelengths of the telecentric image to the light output.

2. The configurable wavelength routing device of claim 1, wherein the dispersive optical element is a grating.

3. The configurable wavelength routing device of claim 1, wherein the controller for operating the reflectors includes an electronically addressable micro electromechanical system (MEMS).

4. The configurable wavelength routing device of claim 1, wherein the controller is operative to position individual reflectors in at least one of two positions, such that light from similarly positioned reflectors are delivered to one of two outputs, respectively.

5. The configurable wavelength routing device of claim 4, wherein the same dispersive optical element is used to recombine the light from the similarly positioned reflectors to one of two outputs laterally displaced on opposite sides of the input.

6. The configurable wavelength routing device of claim 4, wherein one of the outputs functions as an express port and the other functions as a drop/add port.

7. The configurable wavelength routing device of claim 1, wherein the reflectors are controllable between:
   a first position wherein they are V-shaped; and
   a second position, wherein one side of the V is folded down substantially parallel to the image plane to return selected wavelengths to the light input.

8. The configurable wavelength routing device of claim 1, wherein the reflectors are W-shaped and controllable between:
   a first position wherein selected wavelengths are routed to an add/drop port; and
   a second position, wherein non-selected wavelengths communicate with an add/drop port.

9. An optical add/drop module, comprising:
   a common port;
   an express port;
   a drop/add port;
   a dispersive optical element operative to receive light and output a dispersed spectrum;
   a lens to form a telecentric image of the dispersed spectrum at an image plane;
   an array of reflectors disposed at the image plane; and
   apparatus for controlling the reflectors to:
   a) divert wavelengths contained in the telecentric image of the light received through the common to the drop/add port while permitting remaining wavelengths to pass through the express port; or
   b) insert wavelengths entering through the drop/add port into the telecentric image of light received through the express port and output the merged spectrum through the common port.

* * * * *